June 13, 1961 P. ESCHMANN ET AL 2,988,387
METHOD AND MEANS OF ASSEMBLING PARTS BETWEEN WHICH AN
INTERFERENCE FIT IS TO BE PROVIDED
Filed July 12, 1955
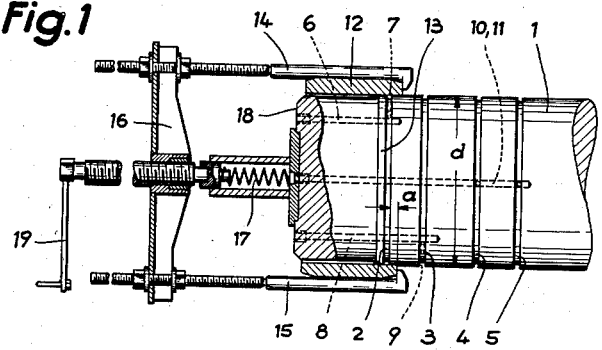
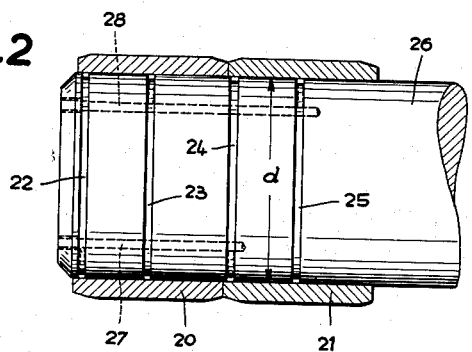
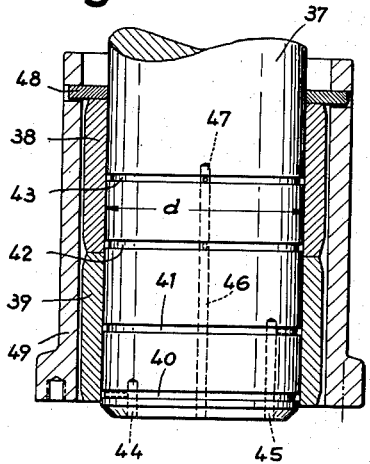
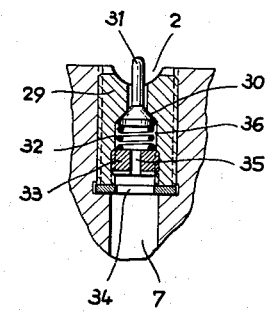
Inventors:
Paul Eschmann,
Wilhelm Völkening, and
Siegfried Buhl
by:
Michael S. Striker
agt.

United States Patent Office 2,988,387
Patented June 13, 1961

2,988,387
METHOD AND MEANS OF ASSEMBLING PARTS BETWEEN WHICH AN INTERFERENCE FIT IS TO BE PROVIDED
Paul Eschmann, an den Schanzen 3, Schweinfurt, Germany, Wilhelm Völkening, Deutschhoferstr. 62, Schweinfurt, Germany, and Siegfried Buhl, Volcach 23, Germany
Filed July 12, 1955, Ser. No. 521,562
Claims priority, application Germany July 12, 1954
4 Claims. (Cl. 287—53)

Where it is intended to assemble in a simple manner such parts as between which an interference fit has to be established as is the case, for example, between a shaft and a sleeve member, and where it is intended, if necessary, to disassemble such parts, use has hitherto been made of a known method according to which suitable grooves provided in the seating surface of the shaft member are supplied with a hydraulic fluid such as oil which is introduced under a sufficiently high pressure so as slightly to expand the sleeve member and thus to disengage the latter from the shaft. The firm interference fit can thus be loosened to the effect that both assembling and disassembling operations are facilitated. This known method has particularly proved its usefulness in cases in which an interference fit has to be established between antifriction bearing members and their associated shafts.

However, the known method indicated above and the appliances used to carry this method into effect have a drawback in that, particularly in cases in which parts having cylindrical seating surfaces have to be assembled or disassembled, the pressure fluid film will disappear within a period of time that is shorter than that required for the assembling or disassembling operations. This is particularly true in cases in which any pressure fluid passages in one of the seating surfaces remain uncovered before the completion of the respective operation.

The present invention eliminates the aforesaid drawbacks by providing, for the purpose of assembling parts between which an interference fit has to be established, and particularly for the purpose of installing anti-friction bearings, a method whereby the fitting and the removal of a sleeve member on or from a shaft, respectively, is facilitated by introducing a hydraulic pressure fluid into grooves provided in the parts to be assembled, and whereby at least two of said grooves each have a separate supply passage, each of these passages extending axially through part of the assembly, the shorter of these passages serving to supply that groove which is nearest the point of separation of the assembled parts. It will be understood that this arrangement makes it possible to interrupt the flow of the hydraulic fluid to that of the said grooves which, during the assembly procedure, is either not yet or no longer covered by the sleeve member to be fitted onto the shaft member. It will also be obvious that the other of the two grooves receives the pressure fluid under full pressure and that the pressure fluid film formed in this region will slightly lift the inside diameter of the sleeve off the shaft, thus facilitating the assembly operation.

In a specific embodiment of the invention an automatic valve may be provided in the drilled passage which places the end of one of said supply passages in communication with its associated groove, this valve functioning in dependence on the condition of the assembly at any given time and operating to interrupt the flow of the hydraulic fluid to its associated groove as long as said groove remains uncovered. Thus, the above-described action, which is due to the presence of pressure fluid supply passages of different length, is produced automatically.

To carry this method into effect, there may be provided, according to the invention, a valve the valve member of which carries a pin-like extension projecting through the bottom of the groove with which the valve is associated and beyond the diameter of the part in which the groove is provided, the arrangement being such that depression of said extension by the sleeve member to be mounted on the shaft will open the valve to permit the pressure fluid to enter the groove, whereas the flow of pressure fluid is interrupted as long as the said extension projects beyond the said groove. Depending on the condition of the assembly, the valve member under the control of the said pin-like extension will thus automatically stop the flow of pressure fluid to the said grooves as long as said grooves are not yet covered by the sleeve member during assembly and as soon as said grooves are uncovered by the sleeve member during disassembly.

These and other objects and advantages of the invention will become further apparent from the following detailed description, reference being made to the accompanying drawings showing certain preferred embodiments of the invention.

In the drawings:

FIG. 1 is a part-sectional elevation illustrating the general manner in which a sleeve member which is an interference fit on a shaft can be removed from said shaft by the method of the invention.

FIG. 2 is a part-sectional elevation of a shaft carrying press- or interference-fitted sleeve members.

FIG. 3 is a part-sectional elevation of a preferred embodiment of the valve mentioned earlier.

FIG. 4 is a part-sectional elevation illustrating a specific method of removing press- or interference-fitted sleeve members from a shaft, for which purpose the assembly has been placed in a vertical position.

The shaft 1 shown in FIG. 1 has provided therein a plurality of narrow annular grooves 2, 3, 4, 5. Leading to groove 2 is a supply passage 6 extending parallel to the axis of the shaft 1, the passage 6 communicating with groove 2 through a drilled hole 7. Groove 3 communicates with a supply passage 8 which also extends parallel to the axis of the shaft via a drilled hole 9. The grooves 4 and 5 are supplied by separate passages 10 and 11 of suitable length, which passages appear partly superimposed in FIG. 1. Communication between the passages 10 and 11 and the respective grooves 4, 5 is established by drilled holes similar to those provided between the passages 6, 8 and their associated grooves 2, 3.

In FIG. 1 one of two sleeve members which had originally been press-fitted on the seating surface of the shaft, which seating surface is interrupted by the grooves 2 to 5, has already been removed from said shaft. Therefore, this disassembled sleeve is not shown in FIG. 1. The sleeve 12, which had originally been fitted onto the seating surface interrupted by the grooves 4 and 5, has here already been sufficiently displaced to the left in FIG. 1 that the distance "a" between its right-hand end face and the right-hand edge of groove 2 and the corresponding distance between this groove and the shoulder 13 of the shaft 1 is only equal to the ½ power of the shaft diameter. With the sleeve 12 in the position of FIG. 1, the grooves 3, 4, 5 are no longer supplied with oil under pressure. Oil under pressure is only introduced into the groove 2 via the supply passage 6 and the drilled hole 7. The pressure fluid film thus formed on either side of the groove 2 and extending through the distance "a" on either side will slightly expand the sleeve 12, thus lifting it off the diameter of the shaft and faciliating assembly.

The removal of the sleeve 12 from the shaft 1 is assisted by the pulling-off device also illustrated in FIG. 1, this device comprising hook members 14 and 15 which, through the medium of the transverse member or beam 16 and the spring unit 17, permit a suitable force to be applied against the end face 18 of the shaft 1. Upon the spring 17 being tensioned with the aid of the crank 19 and upon the sleeve 12 being expanded by the pressure of the hydraulic fluid introduced into the groove 2 in order to lift the sleeve off the shaft in the manner described, the preloaded spring 17 will automatically pull the sleeve 12 off the end portion of the shaft 1 as soon as the expansion of the sleeve has been carried to a sufficient degree.

FIG. 2 indicates the position of the two sleeve members 20 and 21 in relation to the grooves 22, 23 and 24, 25, respectively when the said sleeve members are press-fitted onto the shaft 26. The grooves 23 and 25 are respectively positioned centrally of the sleeve members 20 and 21, whereas the grooves 22 and 24 are respectively distant from the left-hand ends of the sleeve members 20 and 21 by an amount equaling the ½ power of the shaft diameter "d."

FIG. 2 illustrates an arrangement which constitutes a simplification as compared to the previously described arrangement, this simplification concerning the pressure fluid supply passages. In the arrangement of FIG. 2 the passage 27 serves to supply with pressure fluid, via transverse drill holes of the type referred to, both the grooves 22 and 24, that is to say, those grooves which, when counting from left to right in FIG. 2, have to be given the ordinal numbers 1 and 3. The passage 28 is arranged to supply with pressure fluid the grooves 23 and 25, i.e. those bearing the ordinal numbers 2 and 4, respectively. Thus, one supply passage is associated with the grooves bearing odd ordinal numbers, and another passage is associated with the grooves bearing even ordinal numbers.

To loosen the press-fitted sleeves from the shaft in the arrangement of FIG. 2, first all of the grooves 22 to 25 are supplied with oil under pressure, the oil pressure being increased sufficiently to expand the sleeve members 20 and 21 and thus to lift them off the diameter of the shaft 26. As soon as this effect is obtained, the sleeves 20 and 21 are pushed as a unit off the shaft 26 from right to left in FIG. 2. As soon as the right-hand end of sleeve 21 moves past the groove 25, the supply of oil to this groove is interrupted. In a similar manner, the oil supply to the grooves 24, 23 and 22 is successively interrupted in the order given upon the right-hand end of the sleeve 21 successively moving past the grooves 24, 23 and 22 while being pulled off the shaft 26.

For the purpose of stopping the supply of oil under pressure to the grooves 22 to 25 as the disassembling operation progresses in the manner just described, there may be provided valve means such as illustrated in FIG. 3. This valve means is arranged at the discharge end of the hereinbefore mentioned drill holes (e.g., 7 in FIG. 1) providing communication between the axial supply passages and the said grooves (e.g. 2 in FIG. 1). The valve means is screw-threadedly engaged in an enlarged portion of the respective drill hole, the hole 7 being indicate in FIG. 3. The valve means comprises a valve body 29, a valve member 30 carrying a pin-like extension 31, a valve spring 32 and a valve adjusting screw 33. Upon the groove 2 being covered by a sleeve 12 as shown in FIG. 1, for example, the extension 31 will no longer remain in the position indicated in FIG. 3 but will be depressed inwardly, thus depressing the valve member 30 and compressing the spring 32 so as to permit oil under pressure to reach the groove 2 by way of the drill hole 7, the recesses 34 and 35 and the spring chamber 36. As soon, however, as the sleeve 12 releases the extension 31, the spring 32 which abuts against the valve adjusting screw 33 will force the valve member 30 against its seat in the valve body 29. This action will immediately interrupt the supply of oil to the groove 2, thus preventing any oil being lost. Under certain circumstances this will enhance the action of the oil supplied to grooves other than the groove 2.

FIG. 4 shows an assembly in which a shaft 37 has press-fitted thereon two sleeve members 38 and 39. In this case the arrangement of the grooves 40 to 43 is the same as in the example of FIG. 2. However, each of these grooves has its own supply passage associated therewith, the supply passages being indicated at 44, 45, 46 and 47.

As will be seen in FIG. 4, the shaft 37 carrying the sleeves 38 and 39 is in a vertical position. The upper end of the upper sleeve 38 supports an annular member 48 which in turn carries the weight of a bushing or tubular member 49. The tubular member 49 which is acted upon by gravity serves a function similar to that of the spring 17 in FIG. 1. It will be understood that, as the dismantling operation progresses, the deadweight of the sleeves 38 and 39 in combination with the weight of the loading member 49 supported by the upper sleeve 38 through the annular member 48 will strip the sleeves 38 and 39 off the shaft 37 as soon as the dismantling operation has been prepared by the application of sufficient hydraulic pressure in the manner described earlier.

What is claimed as new is:

We claim:

1. In combination, a carrier member; a sleeve member surrounding said carrier member with interference fit between said members, said carrier member having a defined predetermined outer surface area engaged by the inner surface of said sleeve member, and said carrier member having at least two substantially circumferential grooves spaced from each other in axial direction located in said surface area; supply means including a number of ducts inside said carrier member, each of said ducts communicating with at least one of said grooves for introducing fluid under pressure selectively into each of said grooves for expanding said sleeve member placed with its inner surface over the particular groove, the grooves communicating with one of said ducts being so spaced as to alternate with the grooves communicating with another one of said ducts; and closing means located in said carrier member and actuated by said sleeve member for interrupting the communication between a duct and a groove not covered by said sleeve member, so that said sleeve member can be moved in expanded condition along said carrier member while being placed with its inner surface over at least one of said grooves into which pressure fluid is introduced, while no pressure fluid is introduced into any groove that is not covered by said inner surface of said sleeve member.

2. In combination, a carrier member; a sleeve member surrounding said carrier member with interference fit between said members, said carrier member having a defined predetermined outer surface area engaged by the inner surface of said sleeve member, and said carrier member having at least two substantially circumferential grooves spaced from each other in axial direction located in said surface area; supply means including a number of ducts inside said carrier member, each of said ducts communicating with more than one of said grooves for introducing fluid under pressure selectively into each of said grooves for expanding said sleeve member placed with its inner surface over the particular groove, the grooves communicating with one of said ducts being so spaced as to alternate with the grooves communicating with another one of said ducts; and closing means located in said carrier member and actuated by said sleeve member for interrupting the communication between a duct and a groove not covered by said sleeve member, said closing means including a check valve normally closing the connection between a duct and a groove and having a radially movable control member for opening said valve and projecting in closed position of said valve from said outer surface of said carrier member in the area of the particular groove, so as to be engaged by said sleeve member placed over the particular groove whereby said control member is moved to open the associated check valve, so that said sleeve member can be moved in expanded condition along said carrier member while being placed with its inner surface over at least one of said grooves into which pressure fluid is introduced, while no pressure fluid is introduced into any groove that is not covered by said inner surface of said sleeve member.

3. A carrier member as set forth in claim 2, wherein said check valve includes adjustable spring means for urging said control member into said projecting position.

4. In combination, a carrier member; a sleeve member surrounding said carrier member with interference fit between said members, said carrier member having a defined pre-determined outer surface area engaged by the inner surface of said sleeve member, and said carrier member having at least two substantially circumferential grooves spaced from each other in axial direction located in said surface area, one of said grooves being spaced from one edge of said area a distance substantially equal to the square root of the diameter of said carrier member; supply means including a number of ducts inside said carrier member, each of said ducts communicating with at least one of said grooves for introducing fluid under pressure selectively into each of said grooves for expanding said sleeve member when placed with its inner surface over the particular groove, said grooves communicating with one of said ducts being so spaced as to alternate with the grooves communicating with another one of said ducts; and closing means located in said carrier member and actuated by said sleeve member for automatically interrupting the communication between a duct and a groove not covered by said sleeve member, so that said sleeve member can be moved in expanded condition over said carrier member while being placed with its inner surface over at least one of said grooves into which pressure fluid is introduced, while no pressure fluid is introduced into any groove that is not covered by the inner surface of said sleeve member.

References Cited in the file of this patent

UNITED STATES PATENTS

| | | |
|---|---|---|
| 961,375 | Seabrook | June 14, 1910 |
| 1,505,834 | Westendorf | Aug. 19, 1924 |
| 1,883,662 | Fisher | Oct. 18, 1932 |
| 2,084,439 | Hamer | June 22, 1937 |
| 2,326,138 | Grant | Aug. 10, 1943 |
| 2,576,085 | Vivian | Nov. 20, 1951 |
| 2,748,461 | Ohlsson | June 5, 1956 |
| 2,764,437 | Bratt | Sept. 25, 1956 |
| 2,817,142 | Boden et al. | Dec. 24, 1957 |

FOREIGN PATENTS

| | | |
|---|---|---|
| 71,165 | Denmark | June 12, 1950 |